(12) United States Patent
Shetty et al.

(10) Patent No.: US 11,899,734 B2
(45) Date of Patent: Feb. 13, 2024

(54) EXTRACTING AND POPULATING CONTENT FROM AN EMAIL LINK

(71) Applicant: VMware LLC, Palo Alto, CA (US)

(72) Inventors: Rohit Pradeep Shetty, Bangalore (IN); Erich Stuntebeck, Johns Creek, GA (US); Chaoting Xuan, Duluth, GA (US); Sharun Varghese Samuel, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/142,112

(22) Filed: Jan. 5, 2021

(65) Prior Publication Data

US 2022/0215067 A1    Jul. 7, 2022

(51) Int. Cl.
| | | |
|---|---|---|
| *G06F 16/95* | (2019.01) | |
| *G06F 16/957* | (2019.01) | |
| *G06N 20/00* | (2019.01) | |
| *H04L 51/066* | (2022.01) | |
| *G06F 16/955* | (2019.01) | |
| *H04L 5/18* | (2006.01) | |
| *H04L 51/08* | (2022.01) | |
| *H04L 51/42* | (2022.01) | |

(52) U.S. Cl.
CPC ...... *G06F 16/9577* (2019.01); *G06F 16/9558* (2019.01); *G06N 20/00* (2019.01); *H04L 5/18* (2013.01); *H04L 51/066* (2013.01); *H04L 51/08* (2013.01); *H04L 51/42* (2022.05)

(58) Field of Classification Search
CPC . G06F 16/9577; G06F 16/9558; G06N 20/00; H04L 5/066; H04L 51/08; H04L 51/18; H04L 51/22
See application file for complete search history.

(56) References Cited

U.S. PATENT DOCUMENTS

| | | | |
|---|---|---|---|
| 8,943,520 B1* | 1/2015 | Roka | H04L 67/04 |
| | | | 719/320 |
| 2006/0101514 A1* | 5/2006 | Milener | G06Q 20/145 |
| | | | 726/22 |
| 2006/0143568 A1* | 6/2006 | Milener | G06F 16/957 |
| | | | 715/738 |
| 2008/0201332 A1* | 8/2008 | Souders | G06F 16/9535 |
| 2014/0282136 A1* | 9/2014 | Marantz | G06F 3/0484 |
| | | | 715/764 |
| 2016/0011725 A1* | 1/2016 | D'Argenio | G06F 3/0482 |
| | | | 715/825 |
| 2016/0196013 A1* | 7/2016 | Gardenfors | G06F 3/0484 |
| | | | 715/783 |
| 2019/0147017 A1* | 5/2019 | Tran | G06Q 10/00 |
| | | | 715/720 |

* cited by examiner

*Primary Examiner* — Hope C Sheffield
(74) *Attorney, Agent, or Firm* — King Intellectual Asset Management

(57) ABSTRACT

Systems and methods are described for extracting and populating content from an email link. In an example, a machine learning ("ML") model can be trained based on user interactions with emails. When an email is received for the user, the ML model can be applied to score the email. An application can extract a link in the email. The application can retrieve a web page with the link and store it locally. The application can create a card for the email that includes the link and insert the card into a graphical user interface ("GUI"). A user can access the GUI and select the card. The web page can be retrieved from the local storage and displayed in the GUI.

20 Claims, 6 Drawing Sheets

EXTRACTING AND POPULATING CONTENT FROM AN EMAIL LINK

BACKGROUND

With the increased popularity of using software as a service ("SaaS") to provide products to employees and clients, most emails users receive today are contain redirects via weblinks. This results in the user performing from the same repetitive set of actions wherein the user visits his email client, opens an email containing web links, and then opens the relevant webpage using the web browser.

This repetitive routine is time consuming and inconvenient for the user who has to go into each email, click on the link, and wait for the web browser or WebView to load the web page. Sometimes these links are not even accessible to the user, but the user is unaware until the browser attempts to connect to the web page. Also, emails contain links that the user never selects, but the user still must navigate through emails with irrelevant links to find the ones he needs. Furthermore, this wastes computing resources on the user's device as it constantly opens and closes its browser application.

Additionally, users sometimes overlook emails that relate to topics that the user typically addresses at some other time in the workday. Current systems do not assist users with gathering the relevant information at the relevant time. Instead, users must sift back through their inbox repeatedly each day.

As a result, a need exists for providing email links relevant to a user in a personalized interface.

SUMMARY

Examples described herein include systems and methods for extracting and populating content from an email link. In an example, a management application can gather data relating to user interactions with an email application. The stages described herein as being performed by a management application can be performed on a user device, a server, a cloud service, or some combination of those three. The management application can train a machine learning ("ML") model based on the user interaction data.

In an example, when a new email is received at a secure email gateway ("SEG") or at a recipient user device, the management application can apply the ML model to the email. This can allow the management application to determine whether to create a tile in a graphical user interface ("GUI") for the email or linked content within the email. The ML model can determine whether the email contains a link, the accessibility of the link, and how relevant the link is to the user. In one example, the ML model can be a classification model that assigns a score to the email based on predetermined factors. If the email exceeds a threshold score, a tile can be created for the link.

In an example, the management application can retrieve a web page at the address of the link and save it in a local cache. The management application can also create a tile for the email link. In one example, the tile can include the link and information from the email. The management application can insert the tile into a GUI customized for the user. In one example, the GUI can include multiple tiles, each tile representing pertinent information for the user, such as other email links and calendar events. In an example, the management application can apply the ML model to determine how to present the tiles in the GUI. In another example, the management application can dynamically change the tile arrangement based on user activity. The management application can also retrain the ML model based on how the user interacts with the tiles. In an example, when a user selects the tile with the link, the management application can retrieve the web page from the local storage and display it in the GUI.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Systems and methods are described for extracting and populating content from an email link. In an example, an ML model can be trained based on user interactions with their email. Based on past interactions, when an email is received for the user, the ML model can score the email based on content of the email, such as one or more links within the email. An application can extract a link in the email. The application can retrieve a web page with the link and store it locally. The application can create a tile for the email that includes the link and insert the tile into a graphical user interface ("GUI"). A user can access the GUI and select the tile. The web page can be retrieved from the local storage and displayed in the GUI.

Figure 1:
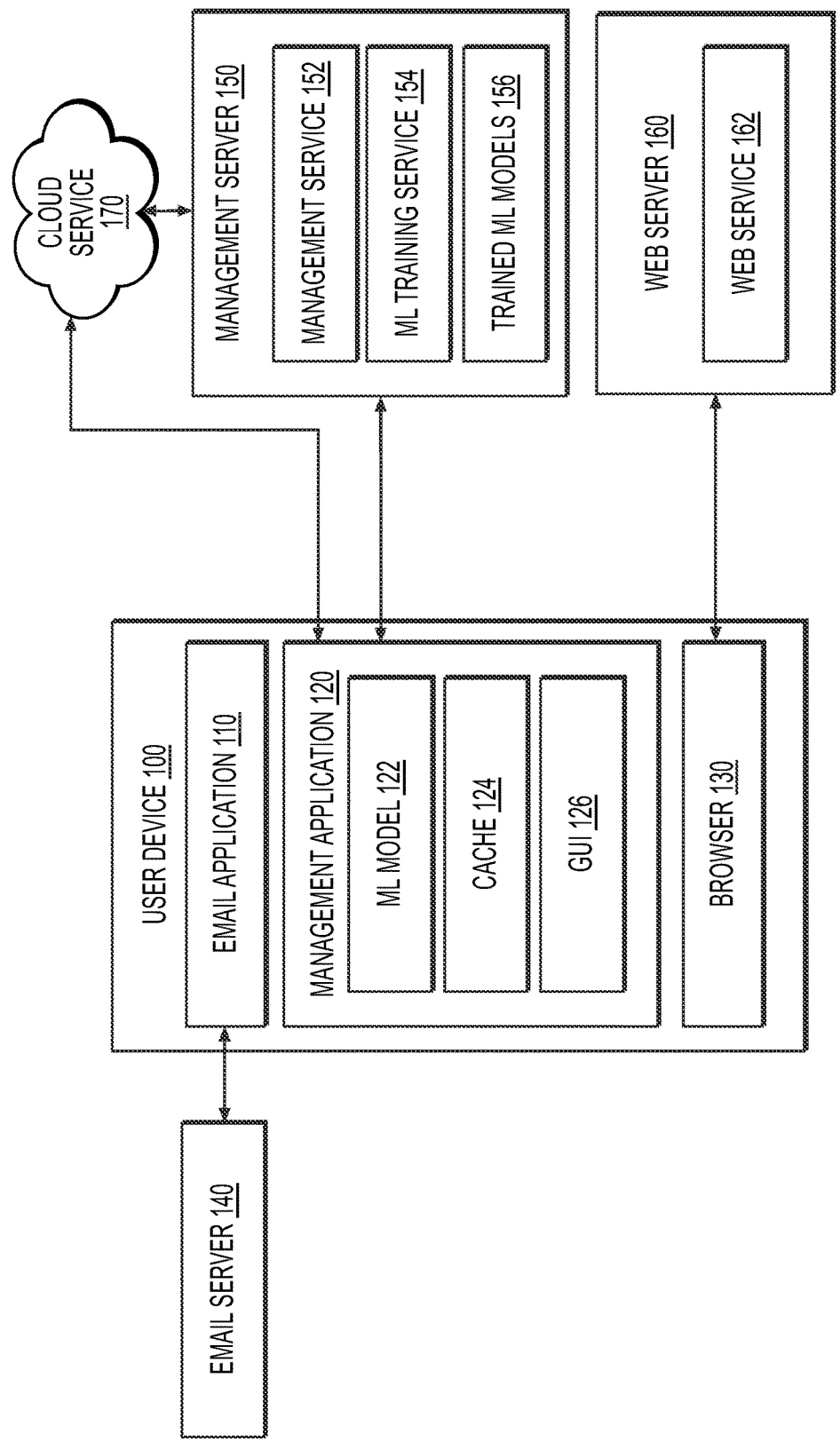
FIG. 1 is an illustration of an example system for extracting and populating content from an email link.

FIG. 1 is an illustration of an example system for extracting and populating content from an email link. In an example, the system can include a user device 100, email server 140, management server 150, and web server 160. The user device 100 can be one or more processor-based devices, such as a personal computer, tablet, or cell phone. The email server 140, management server 150, and web server 160 can each be a single server or a group of servers, including multiple servers implemented virtually across multiple computing platforms. The email server can include a SEG in one example.

In an example, the user device 100 can include an email application 110. The email application 110 can be responsible for receiving and managing emails for an email account. In one example, the email application can be a web application accessible via a browser, like browser 130. For example, a user can access emails by navigating to a web page in the browser 130 and providing credentials of the email account. In one example, the management application 120 can store credentials for the email account and contact the email server 140 to retrieve emails, or data relating to the emails, on behalf of the user.

The management application 120 can be a stand-alone application, part of an enterprise application, or part of an operating system of the user device 100. The management application 120 can be part of an enterprise Unified Endpoint Management ("UEM") system that manages and secures user devices that are enrolled with the enterprise. For example, the management application 120 can be responsible for ensuring that user devices are up to date with compliance and security settings prior to accessing enterprise data and resources. The management application 120 can communicate with a management service 152 on the management server 150, allowing UEM management of user device 100 based on compliance and security settings at the management server 150. The management application 120 can enforce compliance at the user device 100, such as by wiping enterprise data when compliance standards are not met. Example compliance standards can include ensuring a device is not jailbroken, that particular encryption standards are used in enterprise data transmission, that the device does not have certain blacklisted applications installed or running, and that the device is located within a geofenced area when accessing certain enterprise resources.

In one example, the user's email account can be an enterprise email account. For example, the email address can be provided and managed by an enterprise. The email server 140 can be part of the UEM system along with the management server 150. The management server 150 can enforce email rules and settings at the email server 140. For example, the management server 150 can enforce lists, such as blacklists and whitelists, for emails passing through the email server 140.

In an example, the management server 150 can include an ML training service 154. The ML training service 154 can train ML models 156 based on user activity with emails at the user device 100. For example, the management application 120 can gather data on user interactions with emails. Some examples can include which emails the user views, what time of day the user typically views them, which emails the user deletes without reading, and which email links the user clicks on. In one example, the management application 120 can be part of the email application 110 and track user interactions with the email. Alternatively, the management application 120 can monitor user interactions by separately executing as a process on the user device 100 or as part of the operating system on the user device 100. The management application 120 can send the interaction data to the management server 150. The ML training service 154 can train an ML model 156 with the interaction data to identify user tendencies.

In one example, the management server 150 can send an ML model 122 of a user associated with the user device 100 that can be stored by the management application 120. For example, the management application 120 can store the ML model 122 in a cache 124. The cache 122 can be a non-volatile random-access memory ("NVRAM") on the user device 100. In one example, different models can be trained and stored for different users.

The management application 120 can include a graphical user interface ("GUI") 126. In an example, the GUI 126 can include tiles with information derived from emails received by the user's email account. For example, when an email is received, the management application 120 can extract data from the email, including any links. In an example, a link can be a hyperlink that points to an external source, such as a uniform resource locator ("URL") of a web page. The management application 120 can create tiles and organize them in the GUI 126.

In one example, the management application 120 can apply the ML model 122 to determine how to organize the tiles. As an example, the ML model 122 can prioritize the tiles based on a variety of factors, such as how frequently the user clicks on email links of the same domain, time-based user patterns (e.g., the time of day the user typically clicks on email links of a certain domain), and related events or deadlines in the user's calendar. In one example, the management application 120 can include a predetermined number of tiles in the GUI 126, and the tiles included can be those with the highest rated priorities. In another example, the ML model 122 can calculate an importance score for each email link based on the previously described factors, and the GUI 126 can include any tiles that exceed a threshold importance score. In one example, the ML model 122 can be used to dynamically rearrange the tiles. For example, the tiles can be rearranged based on the detected time-based user patterns. As an example, in the morning hours the GUI 126 can include tiles with links of domains that the user typically views during those morning hours, and in the afternoon hours the GUI 126 can be rearranged to display tiles with links that the user typically views in those afternoon hours.

In an example, a user can access the GUI 126 through an application on the user device 100. In another example, the user can access the GUI 126 through the browser 130. In one example, the browser 130 can retrieve the GUI 126 from the management application 120. In another example, the management server 150 can communicate with the email server 140 to retrieve email links and data. The management server 150 can create the tiles and configure the GUI 126. In such an example, the browser 130 can retrieve the GUI 126 from the management server 150.

In an example, when an email includes a link, the management application 120, or the management server 150, can communicate with a web server 160 to retrieve the associated web page. In an example, a web service 162 on the web server 160 can handle web page requests. The management application 120 can save the web page to the cache 124. When a user selects a link in a tile, the browser 130 can retrieve the web page from the cache 124.

In an example, some responsibilities in the methods described herein can be handled by a cloud service 170. The cloud service 170 can be a service provided on demand via the Internet from a cloud computing provider. In some examples, the cloud service 170 can handle responsibilities like training the ML model 156, applying the ML model 122 to an email, retrieving and saving the web page, configuring the GUI 126, and providing the GUI 126 to the user device 100.

Figure 2:
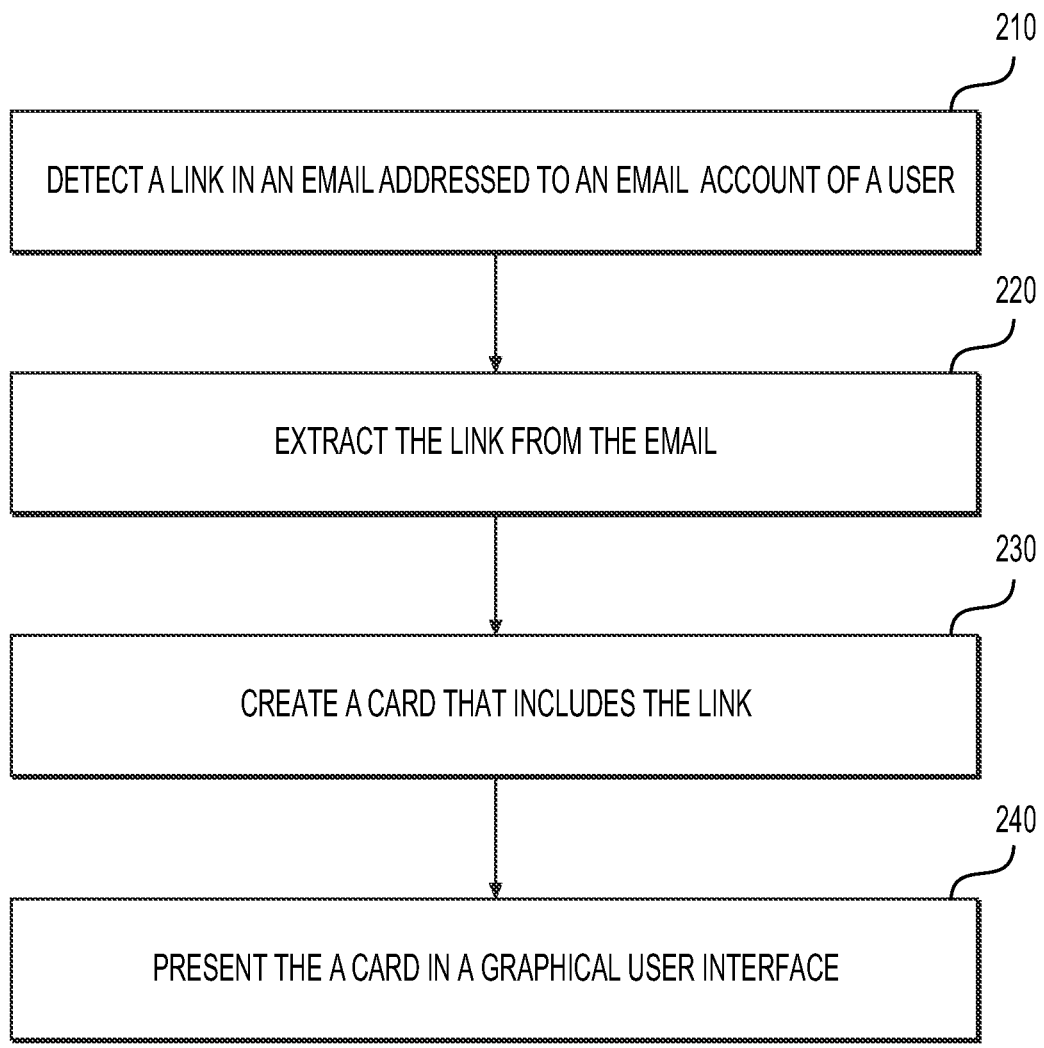
FIG. 2 is a flowchart of an example method for extracting and populating content from an email link.

FIG. 2 is a flowchart of an example method for extracting and populating content from an email link. At stage 210, the management application 120 can detect a link in an email addressed to an email account of a user. For example, the management application 120 can have access to emails received by the email application 110. When the email application 110 receives an email, the management application 120 can determine whether the email contains any links. In an example, a link can be a hyperlink with a URL that points to a web page.

In one example, the email link can be detected by the management server 150, SEG, or email server 140. For example, the email server 140 can manage email traffic for an email domain. This can include storing email inboxes for email addresses with the email domain. The management server 150 can have access to the emails stored on the email server 140. When the email server 140 receives an email for one of the email addresses, the email server 140 can notify the management server 150. The management server 150 can analyze the email to determine whether it contains any links. Alternatively, the email can be analyzed at the SEG prior to routing the email to the email server 140, or at the email server 140 itself.

At stage 220, the management application 120 can extract the link from the email. In an example, this can include determining the accessibility of the link. For example, the management application 120 can determine whether it can connect to the host of the link. In one example, the management application 120 can compare the link, or the link's domain, to one or more lists, such as a whitelist or blacklist. As an example, where the email address is managed by a UEM system, the UEM system can include whitelists and blacklists for allowable and prohibited web pages. The management application 120 can compare the link or its domain to the whitelist and blacklist to determine whether the user is allowed to access its associated web page on an enterprise-managed device.

In an example, the management application 120 can determine whether any permission restrictions may prevent the user from accessing the web page. For example, the management application 120 can perform a backend check with the web page of the link using stored user credentials. Presenting inaccessible links to a user in the GUI 126 only clutters the display. In an example, the management application 120 can check for permissions by instructing the browser 130 to make a dummy request to the web server 160 using the link. If the web server 160 responds with a request for credentials, the management application 120 can send credentials for the user through the browser 130 to see if the credentials are accepted.

In an example, the management application 120 can retrieve the web page and store it in the cache 124. This can make the web page available to the user even when the user device 100 is offline. In one example, the cache 124 can be a cache for the browser 130.

In one example, the link can be extracted by the management server 150. For example, the management server 150 can extract the link from the email at the email server 140. The management server 150 can also compare the link or its domain to any applicable whitelist or blacklist and perform a backend credential check if necessary.

At stage 230, the management application 120 can create a tile that includes the link. In an example, tiles can be interactive elements in the GUI 126 that display content pertinent to the user. As an example, tiles can include information related to emails and scheduled calendar events for the user. In an example, the management application 120 can create tiles for emails sent to the user's email address. When a received email includes a link, the management application 120 can extract the link and insert it into the tile. The tile can include other content related to the email as well, such as the sender, subject, and a screen shot of the email. In one example where the web page is stored on the user device's 100 file system, such as in the cache 126, the link can redirect to the cached page.

In an example, the management application 120 can group email content from multiple emails into a single tile. For example, tiles can be grouped by sender or based on keywords. In an example, the tiles can be part of a dashboard.

At stage 240, the management application 120 can present the tile in the GUI 126. As an example, the management application 120 can present the GUI 126 on a display of the user device 100 when the user accesses the management application 120. In an alternate example, the GUI 126 can be accessed as part of another application on the user device 100, such as the browser 130.

In an example, the tiles in the GUI 126 can respond based on user interactions. For example, a tile can include a short description of an email and a link. If a user taps on the tile, the cached web page can be loaded in the GUI 126. If the user does a long press on the tile, the tile can expand to provide additional information about the email.

In one example, the GUI 126 can be cloud-based. For example, the GUI 126 can be created by the management server 150. The management server 150 can create and configure tiles for the GUI 126 based on emails received at the user's email account. In one example, the management server 126 can store and provide the GUI 126 to the user device 100. In an alternate example, the management server 126 can send the GUI 126 to the cloud service 170 that the user can access via the browser 130. The cloud service 170 can also store the cached web pages. When a user selects a tile with a link, the cloud service 170 can provide the web page in the GUI 126.

Figure 3:
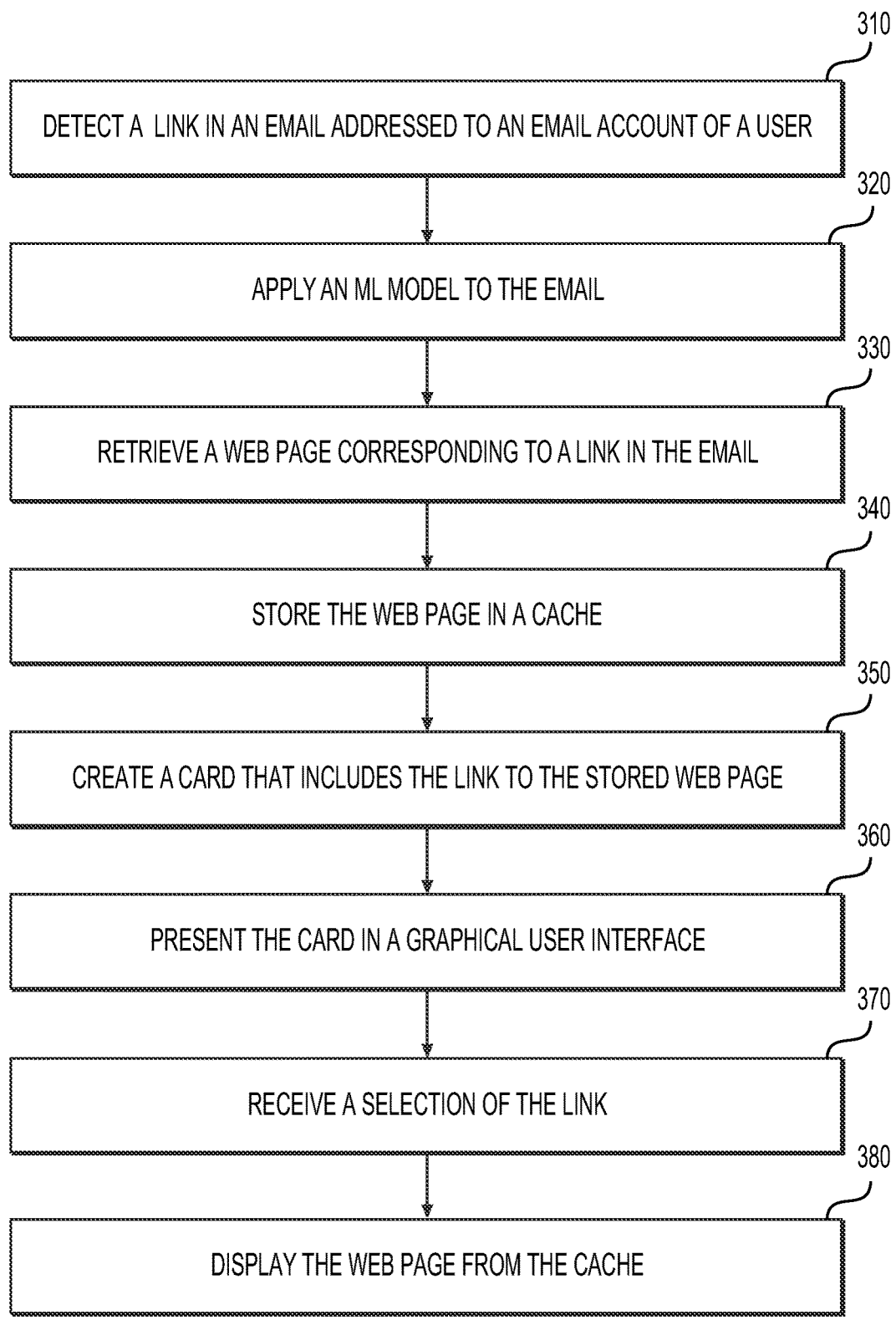
FIG. 3 is another flowchart of an example method for extracting and populating content from an email link.

FIG. 3 is another flowchart of an example method for extracting and populating content from an email link. At stage 310, the management server 150 can train an ML model 156 based on user interactions with emails. As an example, the management application 120 can collect data based on user interactions with email in the email application 110. The management application 120 can track such things as which links the user clicks on, what time the user clicks on a link, what time a user opens each email, which emails the user deletes without viewing, and which emails the user replies to and when. The management server 150 can use this data to train an ML model 122 based on the user behavior. In one example, the management server 150 can train a unique ML model 122 for each user in an organization.

In an example, training an ML model 122 can include identifying user tendencies. For example, the ML model 122 can identify which email links the user usually selects and whether the user opens the links via a WebView or the browser 130. The ML model 122 can also identify time-based patterns for when the user typically views certain emails or selects certain links. In one example, the management server 150 can also train the ML model based on patterns detected from user interactions with tiles in the GUI 126. For example, the ML model training can be based on which tiles the user interacts with and whether the user launches the related link in a WebView or Browser versus within the GUI 126.

In an example, the ML model 122 can be trained using a binary classification algorithm, such as logistic regression, naïve bayes, and neural network algorithms. For example, the management server 150 can train the ML model 122 to analyze certain factors in an email and assign a value to each factor. Some example factors can include whether the email includes a link, whether the link leads to a site inside or outside an enterprise network, whether the user has previously accessed the link, the number of times the user has selected the link from the email application 110, the number of times the user has visited a domain of the link from the email application 110, the email sender, the email content, an importance score of the email, an email type (e.g., new, replied, or forwarded), the number of times the user has visiting a URL of the link from another application, such as the browser 130, and the number of times the user has visited a domain of the link from another application. In one example, the ML model 122 can be trained to classify an email or link based on the analysis. As an example, the ML model 122 can attribute a numeric value to each factor to create a score for the email. If the score exceeds a predetermined threshold, then a tile can be created in the GUI 126 for the link in the email.

At stage 320, the management application 120 can apply the ML model 122 to an email. In one example, the management application 120 can apply the ML model 122 to all new emails to the user that are received at the email application 110, SEG, or email server 140. In an example, applying the ML model 122 can include determining the accessibility of a link in the email. For example, the management application 120 can compare the link, or the link's domain, to one or more lists, such as a whitelist or blacklist. In one example, the management application 120 can determine whether any permission restrictions may prevent the user from accessing the web page. For example, the management application 120 can perform a backend check with the web page using stored user credentials. This can include instructing the browser 130 to make a dummy request to the link's URL. In one example, if a URL of the link or its domain is blacklisted, or if the user cannot access the web page, then the ML model 122 can determine that a tile should not be created for the link. For example, web page accessibility can be a factor that trumps all other factors of the email. If the web page is not accessible, the ML model 122 can stop the analysis or give the email a score of 0, as some examples.

In examples where the web page is accessible, the ML model 122 analyze the email to determine whether a tile should be created. For example, the ML model 122 can assign a numerical value to each email factor and generate a score based on the sum of the values. The ML model 122 can then compare the score to a threshold. If the score exceeds the threshold, a tile can be created for the link at stage 350.

In one example, the ML model 122 can be applied at the management server 150. For example, the email server 140 can notify the management server 150 when it receives a new email for the user. The management server 150 can apply the ML model 122 at the server level using the same methods described above.

At stage 330, the management application 120 can retrieve a web page corresponding to a link in the email. In an example, the management application 120 can instruct the browser 130 to request the web page from the web server 160. For example, the browser 130 can make a Hypertext Transfer Protocol ("HTTP") call using the link's URL. The web service 162 can receive the request and send a data file of the web page to the browser 130. In an example, the data file can be a Hypertext Markup Language ("HTML") file.

At stage 340, the management application 120 can store the web page in the cache 124. In one example, the web page can be stored as an HTML file. In another example, the web page can be stored in the cache 124 while a tile associated with the link is available in the GUI 126. After the tile is removed from the GUI 126, the management application 120 can wipe the web page from the cache 124. In one example, the cache 124 can be a cache for the browser 130. The management application 120 can communicate with the browser 130 to display the web page if the user selects the tile of the link.

In one example, the management application 120 can store multiple levels of pages related to the link if the user has the right credentials. For example, the management application 120 can analyze the web page and, using the ML model 122, identify any links on the web page that the user is likely to select. The management application 120 can cache these pages as well. The management application 120 can generate links for these web pages that point to the cached web pages in the local file system of the user device 100. This can give the user access to the web pages even when the user cannot access the network of the web page. In one example, the GUI 126 can give the user an option to enable or disabling web page caching.

In one example, the web page can be retrieved by the management server 150. For example, the management server 150 can make an HTTP call to the web server 160 and receive the web page's HTML file. In one example, the management server 150 can send the web page to the cloud service 170. In an example, the cloud service 170 can be a cloud-based computing platform that manages the GUI 126 for user devices. In one example, the cloud service 170 can store the data file for the web page so that it can be available to be presented in the GUI 126 if the user selects a tile with the web page's link. This can give the user access to the web page when the user device 100 has access to the cloud service 170, but not the web server 160.

At stage 350, the management application 120 can create a tile that includes the link to the stored web page. In an example, tiles can be interactive elements in the GUI 126 that display content pertinent to the user based on the application of the ML model 122. As an example, for emails that score above the threshold, the management application 120 can create a tile with information about the email. If the email includes a link, the link can be inserted into the tile. In one example, the link in the tile can be directed to the cached copy of the web page. In another example, the tile can be created at the management server 150 or the cloud service 170 described above.

At stage 360, the management application 120 can present the tile in the GUI 126. As an example, the management application 120 can present the GUI 126 on a display of the user device 100 when the user accesses the management application 120. In an alternate example, the management application 120 can send the GUI 126 to another application on the user device 100, such as the browser 130. In one example, the GUI can be accessible via a URL. For example, the GUI 126 can be managed at the cloud service 170 previously described. The user can access the GUI 126 in the browser 130 using a URL associated with the GUI 126.

In an example, the management application 120, or the management server 150 depending on where the GUI 126 is managed, can apply the ML model 122 to determine how to arrange tiles in the GUI 126. For example, the ML model 122 can determine which tiles to present at the top of the GUI 126 so that the user sees them first. The arrangement can be based on user behavior patterns. In one example, the ML model 122 can determine scores for each tile, and the management application 120 can arrange the tiles based on the scores, such as by placing the highest scoring tiles toward the top and lowest scoring tiles toward the bottom.

In one example, the management application 120 can dynamically modify the tile arrangement in the GUI 126. As an example, the tile arrangement can be time-based. For example, the ML model 122 can indicate that the user tends to interact with emails or links of a first type during one part of the day and of a second type another part of the day. The management application 120 application can change the priority of the tiles according to what time of day the user typically interacts with that type of tile.

At stage 370, the management application 120 can receive a selection of the link. In one example, the selection can be of a tile that includes the link. In another example, the management application 120 can execute certain actions based on a user selecting a tile. As an example, a tile can display basic information about an email, such as the sender, subject, and a link in the email. If a user selects the link in a predetermined manner, such as by selecting a "More Info" button or with a long touch or click, the tile can expand to present additional details about the email, such as the recipients, text or a screen shot of the email body, or information about the link. If the user selects the link using another method, such as with a short touch or click, the management application 120 can take a different action.

At stage 380, the management application 120 can display the web page from the cache. In an example, the management application 120 can display the web page in response to the user providing a predetermined input type to the tile associated with the web page. Upon receiving the user input, the management application 120 can retrieve the web page from the cache 124 and display it in the GUI 126.

In one example, the cloud service 170 described above can provide the web page to the user device 100. For example, the user can access the GUI 126 through the browser 130 by navigating to a URL of the GUI 126. When a user selects the tile, the cloud service 170 can retrieve the web page from its own cache and present it in the GUI 126, thus avoiding the need for the user to open a WebView or browser from the email application 110.

In one example, the user can have an option to choose whether the web page is stored locally or by the cloud service 170. For example, the GUI 126 can have a setting that a user can toggle between local and remote web page store within the GUI 126. In one example, even when the user selects a local storage option, the cloud service 170 can still maintain the GUI 126 and cache web pages. This can allow a user to access the GUI 126 from other user devices even if the user device 100 is offline.

Figure 4:
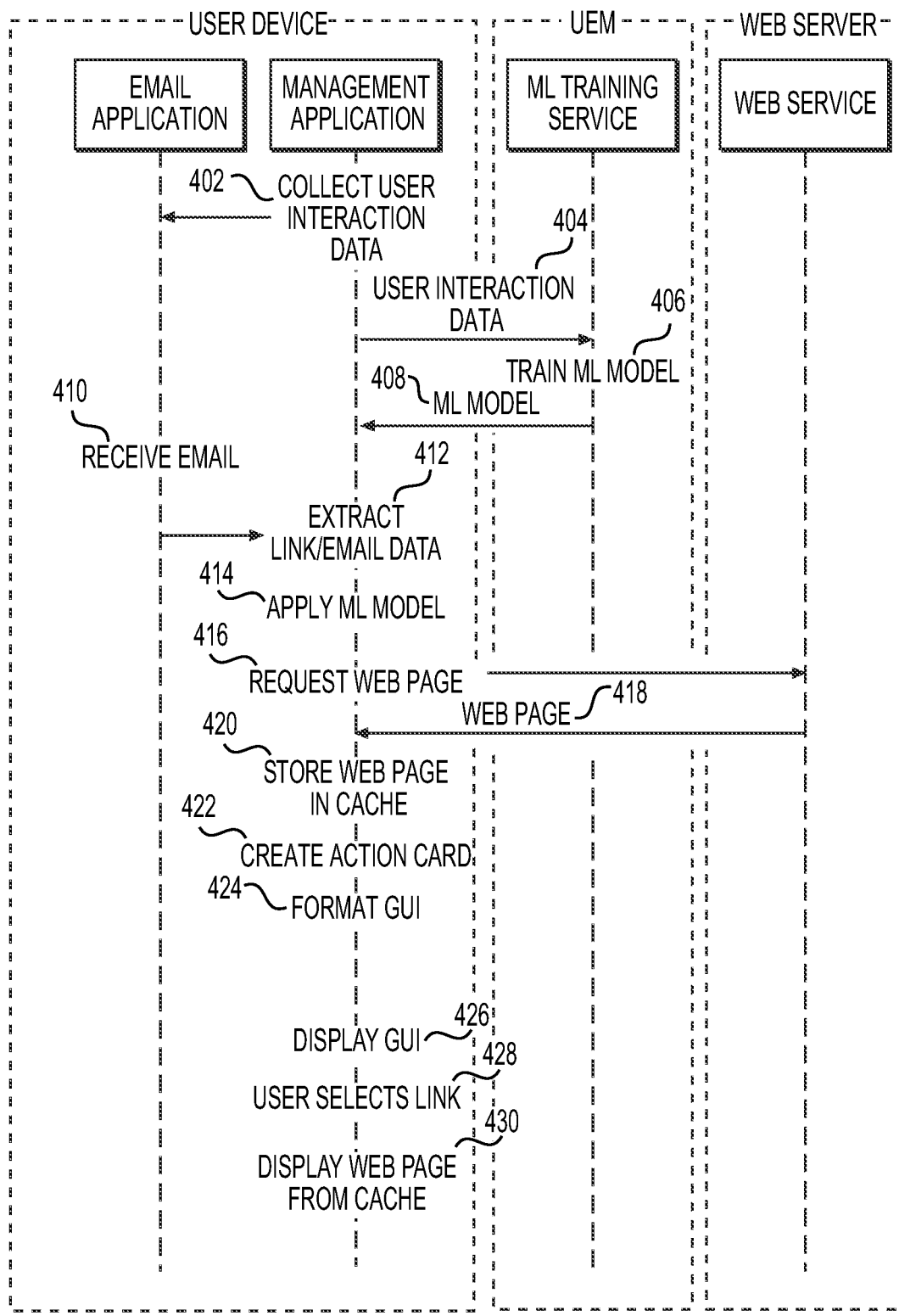
FIG. 4 is a sequence diagram of an example method for extracting and populating content from an email link.

FIG. 4 is a sequence diagram of an example method for extracting and populating content from an email link where the management application 120 handles applying the ML model 122 and storing the web page. At stage 402, the management application 120 can collect user interaction data from the email application 110. For example, the management application 120 collect data on things like which links the user clicks on, what time the user clicks on a link, what time a user opens each email, which emails the user deletes without viewing, and which emails the user replies to and when.

At stage 404, the management application 120 can send the user interaction data to the ML training service 154. In an example, the management application 120 can send the user interaction data as a data file, such as a JavaScript Object Notation ("JSON") or Extensible Markup Language ("XML") file.

At stage 406, the ML training service 154 can train an ML model 122 based on the user interaction data. In one example, the ML training service 154 can train ML models 156 for users for an organization. The ML model 122 can relate to the user of the user device 100. In an example, training an ML model 122 can identify patterns of user behavior with emails in the email application 110. In one example, the management server 150 can also train the ML model based on patterns detected from user interactions with tiles in the GUI 126. In an example, the ML model 122 can be trained using a binary classification algorithm, such as logistic regression, naïve bayes, and neural network algorithms. For example, the management server 150 can train the ML model 122 to analyze certain factors in an email and assign a value to each factor.

At stage 408, the ML training service 154 can send a trained ML model to the management application 120. In one example, the ML training service 154 can send the ML model as a data file. In another example, the management application 120 can store the ML model 122 locally, such as in the cache 124 or an NVRAM of the user device 100. The ML model can be user-specific in an example.

At stage 410, the email application 110 can receive an email. For example, an email can be sent to an email address of the user. The email application 110 can be configured with the user's email settings, like the user's email address, credentials, and server information. The email server 140 can receive the email and pass it to the user device 100. In one example, the management application 120 can be alerted when the email application 110 receives a new email. For example, the email application 110 can post a log for new emails received that the management application 120 is subscribed too.

At stage 412, the management application 120 can extract a link from the email. For example, the management application 120 can analyze the email to detect any links, such as URLs. When the email does include a link, the management application 120 can copy the link to the cache 124.

At stage 414, the management application 120 can apply the ML model 122. In an example, applying the ML model 122 can include determining the accessibility of a link in the email. For example, the management application 120 can compare the link, or the link's domain, to one or more lists, such as a whitelist or blacklist. In another example, the management application 120 can determine whether any permission restrictions may prevent the user from accessing the web page. For example, the management application 120 can perform a backend check with the web page using stored user credentials.

In examples where the web page is accessible, the ML model 122 analyze the email to determine whether a tile should be created. For example, the ML model 122 can assign a numerical value to each email factor and generate a score based on the sum of the values. The ML model 122 can then compare the score to a threshold. If the score exceeds the threshold, a tile can be created for the link at stage 420.

At stage 416, the management application 120 can request a web page associated with the link from the web service 162. In an example, the management application 120 can instruct the browser 130 to request the web page from the web server 160. For example, the browser 130 can make an HTTP call using the link's URL. At stage 418, the web service 162 can send the web page to the management application 120. In an example, the web page can be sent as an HTML file.

At stage 420, the management application 120 can store the web page in the cache 124. In one example, the web page can be stored as an HTML file.

At stage 422, the management application 120 can create a tile. In one example, the tile can be interactive element of the GUI 126 that displays content pertinent to the user based on the application of the ML model 122. In one example, the tile can include the extracted link and information about the link. In one example, the link in the tile can be directed to the cached copy of the web page rather than the URL of the link.

At stage 424, the management application 120 can format the GUI 126. For example, the management application 120 can insert the tile, along with any other created tiles, into the GUI 126. In an example, the management application 120 can apply the ML model 122 to determine how to arrange tiles in the GUI 126. For example, the ML model 122 can determine which tiles to present at the top of the GUI 126 so that the user sees them first. The arrangement can be based on user behavior patterns. In one example, the management application 120 can arrange the tiles based on scores determined when applying the ML model 122 at stage 414. As an example, the management application 120 can place, the highest scoring tiles toward the top and lowest scoring tiles toward the bottom. In one example, the management application 120 can dynamically modify the tile arrangement in the GUI 126. As an example, the tile arrangement can be time-based. For example, the management application 120 application can change the priority of the tiles according to what time of day the user typically interacts with that type of tile.

At stage 426, the management application 120 can display the GUI 126. For example, the GUI 126 can be displayed on a display device of the user device 100, such as a screen or external monitor.

At stage 428, a user can select the link in the tile. In an example, GUI 126 can respond to selections differently depending on the type of selection made. In an example, the user can select the link with a selection type that causes the GUI 126 to display the web page. At stage 430, the management application 120 can display the web page in the GUI 126. In an example, the management application 120 can retrieve the web page from the cache 126 to display it in the GUI 126.

Figure 5:
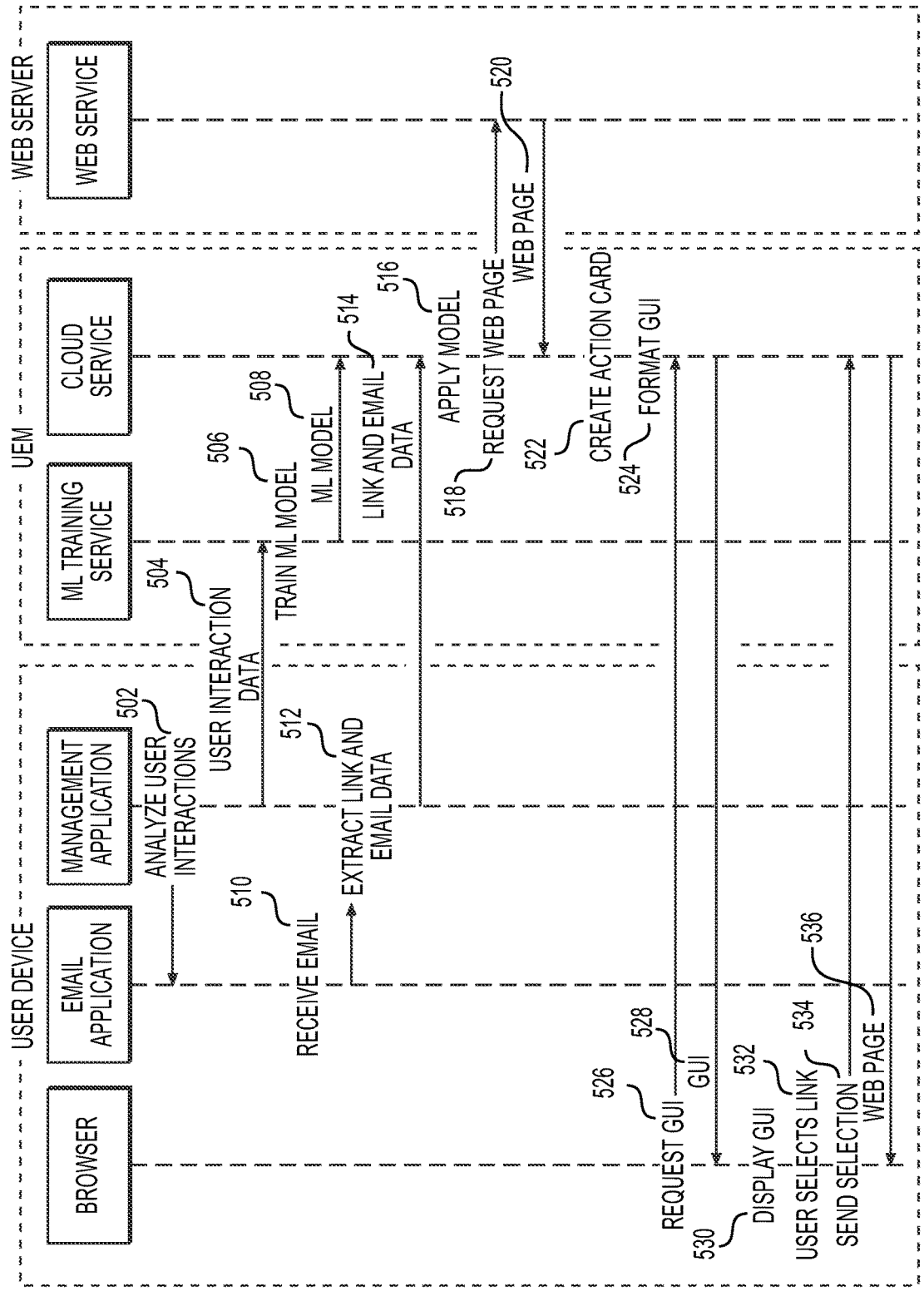
FIG. 5 is another sequence diagram of an example method for extracting and populating content from an email link.

FIG. 5 is another sequence diagram of an example method for extracting and populating content from an email link. At stage 502, the management application 120 can analyze user interactions with the email application 110. For example, the management application 120 collect data on things like which links the user clicks on, what time the user clicks on a link, what time a user opens each email, which emails the user deletes without viewing, and which emails the user replies to and when.

At stage 504, the management application 120 can send the user interaction data to the ML training service 154. In an example, the management application 120 can send the user interaction data as a data file, such as a JSON or XML file.

At stage 506, the ML training service 154 can train an ML model based on the user interaction data. In one example, the ML training service 154 can train ML models 156 for users for an organization. The ML model 122 can relate to the user of the user device 100. In an example, training an ML model 122 can identify patterns of user behavior with emails in the email application 110. In one example, the management server 150 can also train the ML model based on patterns detected from user interactions with tiles in the GUI 126. In an example, the ML model 122 can be trained using a binary classification algorithm, such as logistic regression, naïve bayes, and neural network algorithms. For example, the management server 150 can train the ML model 122 to analyze certain factors in an email and assign a value to each factor.

At stage 508, the ML training service 154 can send a trained ML model to the cloud service 170. In one example, the ML training service 154 can send the ML model as a data file. In another example, the cloud service 170 can store the data file in a cache.

At stage 510, the email application 110 can receive an email. In one example, the management application 120 can be alerted when the email application 110 receives a new email. For example, the email application 110 can post a log for new emails received that the management application 120 is subscribed too.

At stage 512, the management application 120 can extract a link and email data from the email in the email application 110. For example, the management application 120 can analyze the email to detect any links, such as URLs. When the email does include a link, the management application 120 can copy the link. At stage 514, the management application 120 can send the link the cloud service 170. In one example, the management application 120 can also send data related to the email, such as the sender, subject, and body content.

At stage 516, the cloud service 170 can apply the ML model 122. In an example, applying the ML model 122 can include determining the accessibility of a link in the email. For example, the cloud service 170 can compare the link, or the link's domain, to one or more lists, such as a whitelist or blacklist. In another example, the cloud service 170 can determine whether any permission restrictions may prevent the user from accessing the web page. For example, the cloud service 170 can perform a backend check with the web page using stored credentials for the user.

In an example, the ML model 122 analyze the email to determine whether a tile should be created. For example, the ML model 122 can assign a numerical value to each email factor and generate a score based on the sum of the values. The ML model 122 can then compare the score to a threshold. If the score exceeds the threshold, a tile can be created for the link at stage 522.

At stage 518, the cloud service 170 can request a web page associated with the link from the web service 162. For example, the browser 130 can make an HTTP call using the link's URL. At stage 520, the web service 162 can send the web page to the cloud service 170.

At stage 522, the cloud service 170 can create a tile. In one example, the tile can be interactive element of the GUI 126 that displays content pertinent to the user based on the application of the ML model 122. In one example, the tile can include the extracted link and information about the link. In one example, the link in the tile can be directed to the cached copy of the web page rather than the URL of the link.

At stage 524, the cloud service 170 can format a GUI. For example, the cloud service 170 can insert the tile, along with any other created tiles, into the GUI 126. In an example, the cloud service 170 can apply the ML model 122 to determine how to arrange tiles in the GUI 126. For example, the ML model 122 can determine which tiles to present at the top of the GUI 126 so that the user sees them first. The arrangement can be based on user behavior patterns. In one example, the cloud service 170 can arrange the tiles based on scores determined when applying the ML model 122 at stage 516. As an example, the cloud service 170 can place, the highest scoring tiles toward the top and lowest scoring tiles toward the bottom. In one example, the management application 120 can dynamically modify the tile arrangement in the GUI 126. As an example, the tile arrangement can be time-based. For example, the cloud service 170 can change the priority of the tiles according to what time of day the user typically interacts with that type of tile.

At stage 526, the browser 130 can request the GUI from the cloud service 170. At stage 528, the cloud service 170 can send the GUI 126 to the browser 130. At stage 530, the browser 130 can display the GUI 126. In one example, the management application 120 can display the request, receive, and display the GUI 126. For example, the management application 120 can communicate with the cloud service 170 using an application programming interface ("API"). The management application 120 can send inputs from the user and receive the GUI 126 from the cloud service 170.

At stage 532, a user can select a link in the tile. In an example, GUI 126 can respond to selections differently depending on the type of selection made. In an example, the user can select the link with a selection type that causes the GUI 126 to retrieve the web page.

At stage 534, the browser 130 can send the selection to the cloud service 170. In another example, the GUI 126 can be displayed in the management application 120 instead of the browser 130.

At stage 536, the cloud service 170 can send the web page to the browser 130. In an example, in response to the user selection, the cloud service 170 can retrieve the web page from a saved cache. The cloud service 170 can send the web page to the browser 130 so that it is displayed in the GUI 126.

Figure 6:
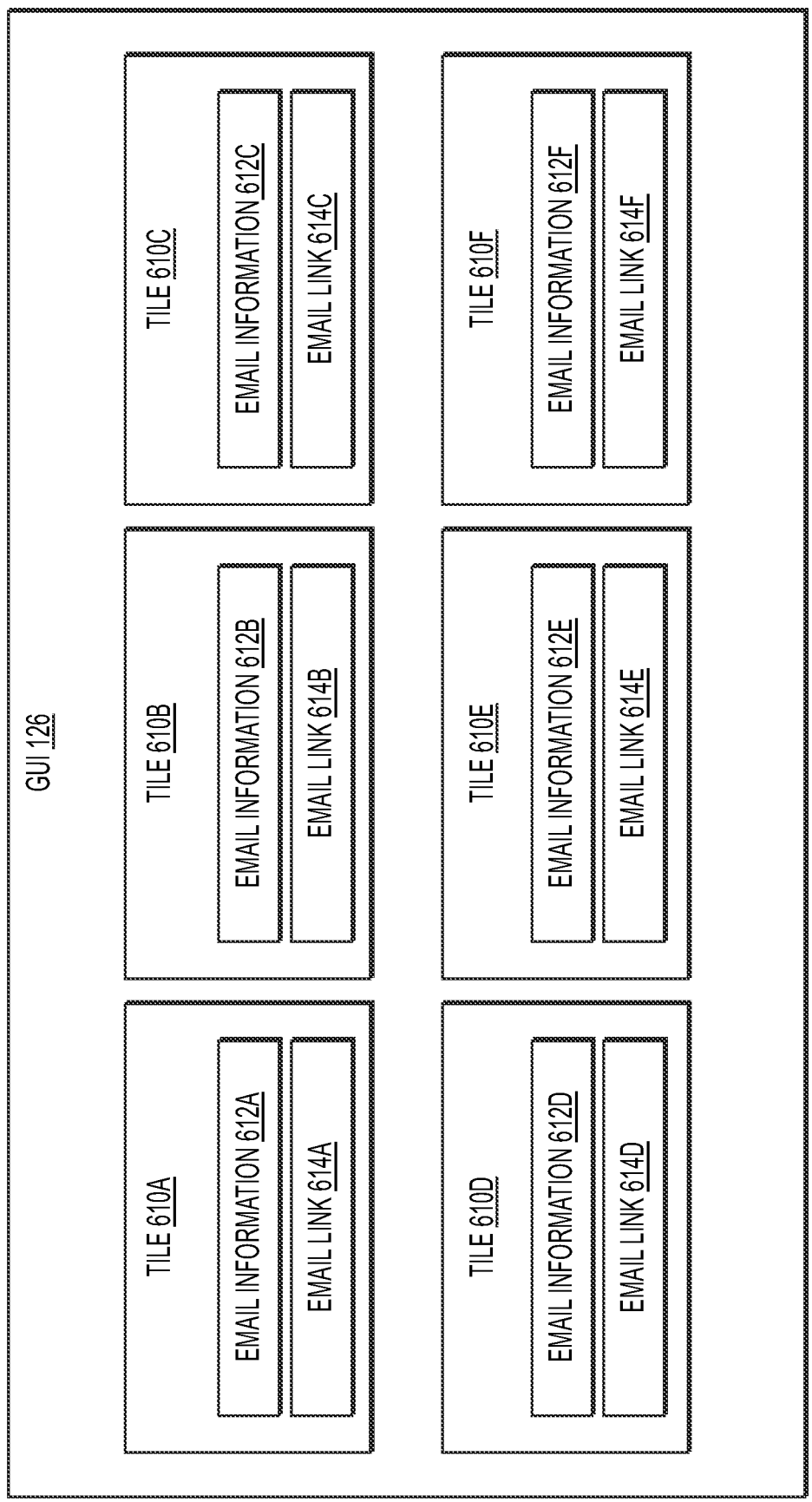
FIG. 6 is an illustration of an example GUI for extracting and populating content from an email link.

FIG. 6 is an illustration of an example GUI 126 for extracting and populating content from an email link. In an example, the GUI 126 can include one or more tiles 610. The number of tiles 610 presented can in the GUI 126 can vary depending on the emails received at a user's email account. Each tile 610 can include email information 612 and an email link 614. In one example, the email information 612 can include basic information about the email that can give the user context about the email ink 614. For example, the email information 612 can include the sender, subject, or a snippet of content from the body of the email. In one example, a selection type, such as a long press on the tile 612, can cause the tile 612 to expand to show additional information about the email.

In an example, the email link 614 can represent the link from an email. In one example, the link 614 can be embedded in the tile 610. For example, the email information 612 can include information about the email link 614, and a selection of the tile 610 by the user can launch the embedded email link 614 within the GUI 126. For example, the web page of the email link 614 can be retrieved from a cache and displayed in the GUI 126. In an example, each of tiles 610A-610F can represent a link for a different email received at the user's email account. In one example, a tile 610 can include email links 614 from multiple emails.

In an example, the tiles 610A-610F can be arranged according to a determined priority. For example, tile 610A can have the highest priority, followed by tile 610B, and so on. In one example, the tiles 610 can be rearranged based on predetermined factors. For example, the priorities of the tiles 610A-610F can change based on the time of day according to user behavior. As an example, the ML model 122 can identify that the user typically engages with links similar to the email link 614A in the morning hours and links similar to the email link 614F in the afternoon hours. In such an example, in the afternoon hours the tile 610F can be moved to the tile 610A position an vice versa.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for extracting and populating content from an email link, comprising:
    detecting links in a plurality of emails addressed to an email account of a user;
    extracting the links from the plurality of emails;
    based on a machine learning model that analyzes user interactions with email links to determine patterns, calculating an importance score for each of the plurality of links;
    retrieving a plurality of web pages corresponding to a subset of the plurality of links, the importance score for each of the subset of links exceeding a threshold;
    storing the retrieved plurality of web pages in a cache;
    for each of the subset of links, creating a plurality of tiles, each of the plurality of tiles displaying at least one link from the subset of links and content information related to an email from which the one link was extracted;
    presenting the plurality of tiles in a graphical user interface ("GUI");
    receiving a selection of a first link in its corresponding tile; and
    displaying a first web page corresponding to the first link from the cache.

2. The method of claim 1, further comprising:
    dynamically rearranging the tiles in the GUI based on learned behavior of the user, the rearranging including prioritizing tiles with links that the learned behavior indicates the user is most likely to interact with based on the current time.

3. The method of claim 1, further comprising:
    receiving a selection of a first tile; and
    responsive to the selection of the first tile, displaying additional information corresponding to a first email associated with the first tile.

4. The method of claim 1, wherein the content information related to the email includes a sender of the email, a subject of the email, and a snippet of content from a body of the email.

5. The method of claim 1, wherein the machine learning model determines patterns based on user interactions with the tiles.

6. The method of claim 1, wherein extracting the link includes performing a backend credential check to determine whether the link is accessible to the user.

7. The method of claim 1, wherein extracting the link includes comparing the link to a list to determine whether the link is allowed or prohibited.

8. A non-transitory, computer-readable medium containing instructions that, when executed by a hardware-based processor, performs stages for extracting and populating content from an email link, the stages comprising:

detecting links in a plurality of emails addressed to an email account of a user;
extracting the links from the plurality of emails;
based on a machine learning model that analyzes user interactions with email links to determine patterns, calculating an importance score for each of the plurality of links;
retrieving a plurality of web pages corresponding to a subset of the plurality of links, the importance score for each of the subset of links exceeding a threshold;
storing the retrieved plurality of web pages in a cache;
for each of the subset of links, creating a plurality of tiles, each of the plurality of tiles displaying at least one link from the subset of links and content information related to an email from which the one link was extracted;
presenting the plurality of tiles in a graphical user interface ("GUI");
receiving a selection of a first link in its corresponding tile; and
displaying a first web page corresponding to the first link from the cache.

9. The non-transitory, computer-readable medium of claim 8, the stages further comprising:
dynamically rearranging the tiles in the GUI based on learned behavior of the user, the rearranging including prioritizing tiles with links that the learned behavior indicates the user is most likely to interact with based on the current time.

10. The non-transitory, computer-readable medium of claim 8, the stages further comprising:
receiving a selection of a first tile; and
responsive to the selection of the first tile, displaying additional information corresponding to a first email associated with the first tile.

11. The non-transitory, computer-readable medium of claim 8, wherein the content information related to the email includes a sender of the email, a subject of the email, and a snippet of content from a body of the email.

12. The non-transitory, computer-readable medium of claim 8, wherein the machine learning model determines patterns based on user interactions with the tiles.

13. The non-transitory, computer-readable medium of claim 8, wherein extracting the link includes performing a backend credential check to determine whether the link is accessible to the user.

14. The non-transitory, computer-readable medium of claim 8, wherein extracting the link includes comparing the link to a list to determine whether the link is allowed or prohibited.

15. A system for extracting and populating content from an email link, comprising:
a memory storage including a non-transitory, computer-readable medium comprising instructions; and
a computing device including a hardware-based processor that executes the instructions to carry out stages comprising:
detecting links in a plurality of emails addressed to an email account of a user;
extracting the links from the plurality of emails;
based on a machine learning model that analyzes user interactions with email links to determine patterns, calculating an importance score for each of the plurality of links;
retrieving a plurality of web pages corresponding to a subset of the plurality of links, the importance score for each of the subset of links exceeding a threshold;
storing the retrieved plurality of web pages in a cache;
for each of the subset of links, creating a plurality of tiles, each of the plurality of tiles displaying at least one link from the subset of links and content information related to an email from which the one link was extracted;
presenting the plurality of tiles in a graphical user interface ("GUI");
receiving a selection of a first link in its corresponding tile; and
displaying a first web page corresponding to the first link from the cache.

16. The system of claim 15, the stages further comprising:
dynamically rearranging the tiles in the GUI based on learned behavior of the user, the rearranging including prioritizing tiles with links that the learned behavior indicates the user is most likely to interact with based on the current time.

17. The system of claim 15, the stages further comprising:
receiving a selection of a first tile; and
responsive to the selection of the first tile, displaying additional information corresponding to a first email associated with the first tile.

18. The system of claim 15, wherein the content information related to the email includes a sender of the email, a subject of the email, and a snippet of content from a body of the email.

19. The system of claim 15, wherein the machine learning model determines patterns based on user interactions with tiles.

20. The system of claim 15, wherein extracting the link includes performing a backend credential check to determine whether the link is accessible to the user.

* * * * *